Oct. 5, 1948.    J. A. GUYER    2,450,753
APPARATUS AND PROCESS FOR HYDROCARBON CONVERSION
Filed Aug. 29, 1947
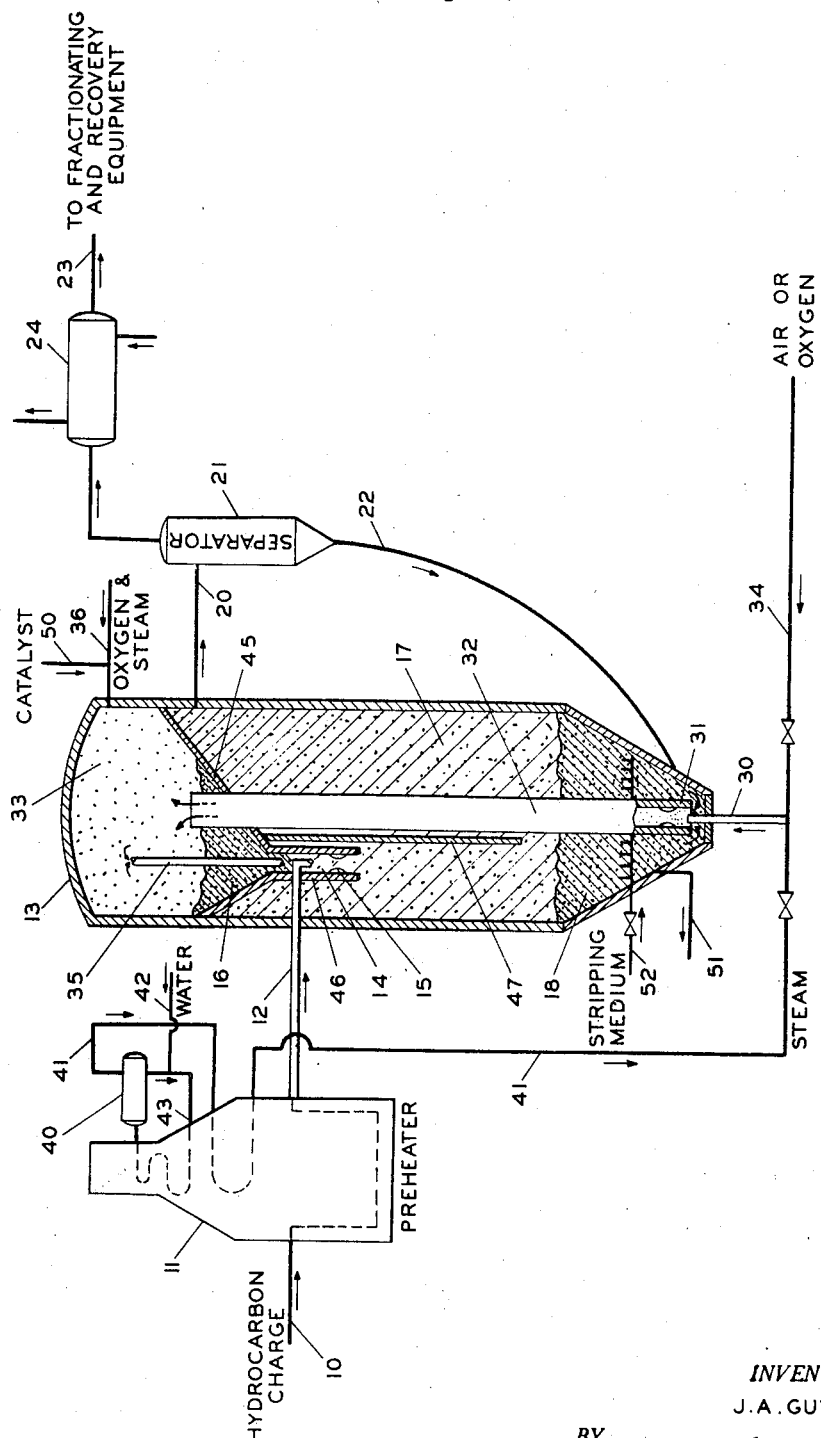
INVENTOR.
J.A. GUYER
BY Hudson and Young
ATTORNEYS Patented Oct. 5, 1948

2,450,753

UNITED STATES PATENT OFFICE 2,450,753

APPARATUS AND PROCESS FOR HYDROCARBON CONVERSION

Jesse A. Guyer, Bartlesville, Okla., assignor to Phillips Petroleum Company, a corporation of Delaware Application August 29, 1947, Serial No. 771,331

11 Claims. (Cl. 196—52)

This invention relates to a process and apparatus for the catalytic conversion of hydrocarbon oils and for carrying out catalytic reactions in general wherein a suspended solid catalyst is employed in contact with reacting vapors or gases.

In a particular modification, the invention relates to the conversion of hydrocarbon oils by contacting the vapors at conversion temperatures with suspended solid conversion catalyst. In a more particular aspect, the invention relates to an improvement in the simultaneous conversion of oils and the regeneration of spent catalyst within a unitary chamber or converter with improved conservation of the heat of regeneration in the conversion zone.

Numerous methods have been proposed whereby the heat generated during the regeneration of spent solid catalysts may be conserved and transferred indirectly to the reactant hydrocarbon vapors or gases. For example, it has been proposed to have the reaction zone and the regeneration zone side by side in a common chamber and separated from each other by an imperforate heat-conductive wall so that the suspended catalysts may flow in opposite directions in the two zones with the transfer of heat from the hotter regeneration zone to the contiguous reaction zone. Also, it has been proposed to have one zone superimposed over the other zone in a unitary chamber so that the fluidized catalysts may be regenerated in one zone and passed immediately to the reaction zone to conserve the heat within the regenerated catalyst. These various methods have been more or less satisfactory in accomplishing the purpose of conserving the heat of regeneration of the catalyst but have inevitably lost a considerable amount of heat through the inefficiency of the indirect heat exchange, and in the removal of the regeneration gases from the regeneration zone.

I have now discovered an improved method and apparatus whereby all of the heat of regeneration is conserved for the reaction with the exception of that small amount which may be lost through radiation from the walls of a conversion chamber.

It is therefore an object of this invention to provide a process for the conversion of hydrocarbon oils in the presence of suspended catalyst whereby maximum benefits of the heat of regeneration of the catalyst is obtained. Another object of this invention is to provide a process for the conversion of hydrocarbon oils in the presence of suspended catalyst and for the regeneration of this catalyst whereby an effective conservation of heat is realized. A further object of this invention is to provide a process for the conversion of hydrocarbon oils and for the regeneration of catalysts in which regeneration effluent gases are returned with regenerated catalysts and reactant hydrocarbon vapors to the conversion zone. Another object of the invention is to provide a process for the conversion of hydrocarbons and for the regeneration of catalysts in which the catalyst is regenerated in the presence of oxygen and steam and the regeneration effluent gases are returned with the catalyst to the reaction zone. A still further object of this invention is to provide an apparatus for the conversion of hydrocarbon oils and gases and for the regeneration of catalysts in which the regenerated catalysts and regeneration effluent gases are recycled, admixed directly with the reactant hydrocarbons in a reaction zone. Other objects will be apparent to those familiar with the art from the accompanying description and figure.

The accompanying drawing shows one embodiment of the process and a cross-sectional view of the apparatus of the present invention.

Broadly speaking, the present invention provides a process and an apparatus for the conversion of hydrocarbon oil vapors and gases in which regenerated catalyst and regeneration effluent gases are passed together directly from a regeneration zone into a reaction zone in admixture with reactant hydrocarbon vapors and gases. In a particular aspect it provides for the use of oxygen and steam as the oxidizing regeneration gas in burning off the carbonaceous deposits in regenerating the catalyst and the addition of the regeneration effluent to the reacting hydrocarbons. When these compounds are used as the regenerating gas, there is an economic saving in the size and capacity of the necessary equipment and the fixed effluent gases possess a much higher fuel value. Furthermore, with the recycle of the regeneration effluent gases to the reaction zone, it is possible to supply the heat of regeneration present in these gases to the reaction zone and to the reactants therein, as well as the heat carried by the regenerated catalyst. Hence, it is possible to obtain substantially all of the heat of regeneration and supply the same to the reactants in the conversion chamber. All of the heat generated in the regeneration zone is available in the reaction zone through the direct contact of the heated regenerated catalyst and of the heated regeneration effluent gases with the hydrocarbon reactants.

The process and apparatus of this invention have been found to be particularly adaptable to various catalytic conversion processes, such as, reforming, cracking, hydroforming, aromatization, hydrogenation and others, in which appreciable amounts of carbon are formed and deposited on the catalyst during conversion. The process is especially suited for use with those processes of conversion in which the presence of hydrogen is required or desirable, such as hydroforming, since an appreciable amount is present in the regeneration effluent gases as a result of the water gas reaction.

A better understanding of the present invention may be had by consideration of the accompanying figure, which illustrates a hydrocarbon conversion process according to the present invention. A hydrocarbon charge which may be a heavy hydrocarbon oil is introduced through a line 10 to a preheater 11 and through a line 12 into a converter 13 where it is admixed with catalyst and regeneration effluent gases in a mixing tube 14. A constricted area in the mixing tube and vapor entering under pressure form an ejector 15. The speed of the hydrocarbon vapors through the ejector draws catalyst from a zone 16 of settled regenerated catalyst and thoroughly admixes the vapors with the catalyst in a reaction zone 17. The hydrocarbon vapors are converted in the reaction zone and spent catalyst settles to the bottom of the reaction chamber in a heavy phase 18. The products of conversion and any entrained catalyst are removed from the reaction zone through a line 20 to a cyclone separator 21 in which the solid catalyst is separated from the product effluent. The catalyst is returned to the heavy phase in the bottom of the reaction zone through a line 22 and the conversion effluent is removed through a line 23 and a heat exchanger 24 to fractionating and recovery equipment (not shown). Air and/or preferably oxygen from a line 34 and superheated steam from a line 41 are introduced through a line 30 into the throat of an ejector 31 which draws spent catalyst from the heavy catalyst phase in the reactor. The catalyst is carried by the steam-oxygen mixture through a centrally aligned conduit 32 into an upper section 33 of the chamber where the spent catalyst is regenerated by burning the carbon which is deposited on the catalyst. Auxiliary oxygen and steam may be added to the regeneration zone through a line 36 as required to complete the regeneration of the catalyst. Regenerated catalyst settles to the bottom of the regeneration zone in a dense phase and is drawn into the reaction zone with the reactant hydrocarbon vapors through ejector 15 as described. An open conduit 35 extends from the upper region of the regeneration zone into the throat of the ejector 15 to allow passage of regeneration effluent gases and catalyst into the reaction zone and to prevent the regenerated catalyst from clogging the inlet to ejector 15. Steam is supplied to line 30 from a steam drum 40 through line 41 and additional water is supplied to the steam supply system through a line 42 in the recirculation line 43 from the steam drum. A baffle 45 in the shape of an oblique cone or of a hopper partitions the chamber into the upper section or regeneration zone and into the lower section or reaction zone. A tubular passageway 46 connecting the two sections is attached to the hopper-shaped baffle at the lowermost extremity thereof and forms the mixing zone 14 for the catalyst and reactants and houses the ejector 15. A baffle 47 is attached to the conical baffle 45 to distribute the flow of the mixture of vapors and catalyst in the reaction zone and to prevent the short-circuiting of this mixture to the outlet of the reaction chamber without sufficient contact time of the hydrocarbon vapors and catalyst therein. Additional catalyst may be added through a line 50 and introduced with the auxiliary oxygen and steam as required. Also, catalyst may be removed through a line 51 from the bottom of the chamber as desired. Thus, the oxygen and steam introduced into the regeneration zone and the regeneration effluent gases produced therefrom are passed with the regenerated catalyst in admixture with the reactant vapors to the reaction zone. The regeneration effluent gases are removed with the reaction products from the reaction zone and the mixed effluent is separated into fixed gases and other fractions of desirable hydrocarbon products. The catalyst continuously flows from the bottom of the reaction chamber through the central conduit to the upper regeneration zone and back into the reaction zone.

In the regeneration system of the present process either air or oxygen may be used as the oxidizing component of the inlet regeneration gases. Oxygen is the preferred oxidizing gas since the volume of the regeneration stream and of the regeneration effluent may be more easily controlled and large quantities of nitrogen and other inert gases are not introduced when relatively pure oxygen is used. Furthermore, oxygen is preferred since the regeneration effluent gases which are formed when oxygen is used are valuable as fuel and possess a high heat content as fuel. Of course, oxygen contaminated with gases possessing heating value such as carbon dioxide and monoxide are also satisfactory. Likewise, although other inert diluents may be used, steam is preferred since it reacts through the water gas reaction to supply considerable desirable hydrogen and to form other products which possess considerable value as fuel gases. The oxidizing gases and the inert diluent are preheated and introduced at temperatures which instigate and support combustion of the carbon which is deposited on the catalyst during the reaction process. The regeneration effluent gases will contain carbon dioxide, carbon monoxide, and hydrogen and so will add fuel value as well as volume to the fixed gases produced during hydrocarbon conversion. The regenerated catalyst and regeneration effluent gases which, immediately after regeneration is completed, are at temperatures substantially higher than those employed in the reaction zone, are mixed with a regulated volume of reactant hydrocarbons in the mixing zone. The reactant hydrocarbons are preheated and introduced at a temperature such that upon admixture with the catalyst and regeneration effluent gas the temperature of the mixture will be that which is desirable for the particular reaction being conducted. The particular temperature at which the reactant hydrocarbons are introduced will therefore depend upon the nature of the hydrocarbon feed stock, the desired conversion temperature, and the temperature of the regenerated catalyst and the regeneration effluent gases. The temperature generated in the regeneration zone and hence the heat content of the regenerated catalyst and the regeneration effluent is to a large degree dependent upon the amount of carbon which is deposited on the catalyst being regenerated. The amount of carbon deposited in the reaction zone in turn depends to a large extent on the character of the oil feed and the extent of conversion. Furthermore, the temperature, pressure and conversion which it is desired to obtain in the reaction zone will depend upon the character of the reaction involved. Thus, in the cracking of heavy oils, lower temperatures and pressures are usually preferred and in the reforming of naphthas, higher temperatures and pressures are preferred. Thus, very flexible control of the process conditions for various stocks and reactions may be obtained by varying the several factors which effect and regulate the reaction conditions.

Satisfactory catalysts are those which are not adversely affected by moisture and which are suitably regenerated by combustion of carbonaceous deposits in the presence of oxygen and steam. Among the catalysts which have been found suitable are both synthetic and natural highly acid-treated clays, bauxite, and gel-type catalyst comprising silica and/or alumina. The catalyst employed in the process is a refractory solid in a granular or a fine pulverized state, preferably having a particle size sufficiently fine to remain easily suspended in the turbulent vapors but not so fine as to make recovery and separation from the vapors difficult. A catalyst size of about 10 mesh to 300 mesh is satisfactory although somewhat coarse or somewhat finer catalysts may also be employed.

The particular features of this invention are especially suited for the treatment of heavy hydrocarbon stocks, such as, heavy gas oils, and heavy topped crude oil, which it is desirable to preheat only to some temperature below that at which cracking, and deposition of carbon, occurs in the coils of the heater and in the transfer lines and equipment. Thus, the charge may be heated and only partially vaporized in a preheating coil and introduced into the mixing tube of the apparatus where it can be completely vaporized with the hot regeneration effluent gas and catalyst. It is particularly desirable to complete the vaporization of a heavy oil at this point of the process so that any carbon produced will be deposited directly on the catalyst rather than in the heating coil and other equipment. It has been found that operating according to the present process in the apparatus described, it is possible to operate indefinitely without shutting down the process to clear the equipment of deposited carbon.

As an illustration of the use of the present process and apparatus as applied to a cracking operation, it has been found that a hydrocarbon oil having a boiling range between about 400 and 1100° F. may be preheated to a temperature between about 700 and 1000° F. at a pressure of from 100 to 500 pounds per square inch absolute, and introduced into the reaction zone at the rate of about 1 pound of oil per 2 to 10 pounds of catalyst. After admixture with the catalyst and regeneration effluent gases, the reaction is conducted at a temperature between about 850 and 1100° F. and a pressure between about atmospheric and 500 pounds per square inch absolute, at a conversion between about 25 and 65 per cent per pass with a carbon deposition of 1 to 15 weight per cent of the catalyst. Oxygen and steam are supplied to the regeneration zone at the rate between about 0.5 and 5 cubic feet of oxygen per pound of steam. Butane-free gasoline boiling to about 400° F. is recovered and has an octane number between about 72 and 82 A. S. T. M.

The applications of the present invention will be obvious to those skilled in the art and it is understood that the scope of the present invention is not limited by any theories proposed or any specific examples given. Various modifications and changes may be made in the process and apparatus as described without departing from the spirit of the invention and the inherent scope of the invention.

I claim:

1. An apparatus for converting hydrocarbon oils by contacting the vapors thereof with a suspended catalyst comprising an elongated vertical chamber having a restricted section at the lower end thereof, a downwardly extending partitioning baffle having the lowermost extremity thereof off-center of said chamber and having a tubular passageway at said lowermost extremity connecting a lower section and a separate upper section of said chamber, an ejector in the lower end of said passageway, an open conduit beginning within said passageway above said ejector and extending into said upper section of the chamber, an inlet extending externally of the chamber and entering said passageway above said ejector, a centrally positioned open conduit extending through the lower section into the upper section of said chamber and having an ejector in the lower end thereof, an inlet in the bottom of said chamber communicating with said central conduit below the ejector therein, and an outlet from the lower section of said chamber.

2. An apparatus for converting hydrocarbon oils by contacting the vapors thereof with a suspended catalyst comprising an elongated vertical chamber, a downwardly extending hopper-shaped partitioning baffle having the lowermost extremity thereof off-center of said chamber and having an opening at said lowermost extremity connecting a lower section and an upper section of said chamber, said opening being constricted to form the throat of an ejector, an open conduit connecting said upper section of the chamber with the throat of said ejector, an inlet extending through an outer wall of said chamber and into the throat of said ejector above the constriction thereof, an open elongated conduit aligned centrally of said chamber and extending vertically through the lower section into the upper section of said chamber, a constriction in the lower end of said elongated conduit forming the throat of a second ejector, an inlet in the bottom of said chamber communicating with said elongated conduit below the throat of said ejector therein, and an outlet below said baffle in said lower section of the chamber.

3. The process of converting hydrocarbon oils which comprises introducing the vapors thereof into a constricted area of a tubular passageway connecting an elongated reaction zone with an elongated regeneration zone, drawing hydrocarbon conversion catalyst and regeneration effluent gases from said regeneration zone into said reaction zone through said passageway with said hydrocarbon vapor, thoroughly mixing said vapors with said regeneration gases and said catalyst, separating in the reaction zone said catalyst from a mixture of conversion products and said regeneration effluent gases, separating said mixture into fixed gases and hydrocarbon fractions, regenerating said catalyst by passing it in fluid suspension through a regeneration zone, introducing an oxidizing regeneration gas into said regeneration ozone, oxidizing and removing carbonaceous deposits from said catalyst, and drawing said regenerated catalyst and regeneration effluent gases at regeneration temperatures into said reaction zone with said hydrocarbon vapors.

4. The process of claim 3 in which said hydrocarbon oil is preheated and partially vaporized and in which the partially vaporized hydrocarbon oil is further vaporized upon admixture with said catalyst and regeneration effluent gases.

5. The process according to claim 3 in which said oxidizing regeneration gas comprises oxygen and steam.

6. The process of converting hydrocarbon oils which comprises introducing vapors thereof into a constricted area of a tubular passageway connecting an upper regeneration zone with a separate lower reaction zone in a conversion chamber, drawing catalyst and regeneration effluent gases downwardly from said regeneration zone through said passageway, thoroughly admixing said vapors with said catalyst and said regeneration effluent gases in said lower reaction zone, allowing said catalyst to settle out of a mixture of conversion effluent and the regeneration effluent gases in said reaction zone, separating said mixture into fixed gases and hydrocarbon fractions, introducing an oxidizing regeneration gas upwardly under pressure into a constricted area of a centrally aligned conduit extending through said lower reaction zone into said upper regeneration zone, drawing said settled catalyst from the reaction zone and carrying the same into said regeneration zone with the regeneration gas, oxidizing and removing carbonaceous deposits from said catalyst, and drawing said regenerated catalyst and products of regeneration into said lower reaction zone with said hydrocarbon vapors.

7. The process according to claim 6 in which said hydrocarbon oil is a heavy high-boiling hydrocarbon oil and is preheated to a temperature at which the oil is only partially vaporized before entering said passageway and in which the partially vaporized oil is sufficiently further heated upon contact with said catalyst and said regeneration gases to substantially completely vaporize and to convert the hydrocarbon oil.

8. The process according to claim 6 in which said oxidizing regeneration gas comprises oxygen and steam.

9. An apparatus for converting hydrocarbon vapors and gases by contacting the same with a suspended catalyst comprising an elongated cylindrical vertical chamber having a restricted conical section at the lower end thereof, a hopper-shaped partitioning baffle intermediate the ends of said chamber separating said chamber into an upper cylindrical section and a lower cylindrical section for directing catalyst from said upper to said lower section and having the lowermost extremity of said baffle off-center of said chamber, a tubular opening in the lowermost extremity of said baffle, said opening being constricted to form the throat of an ejector, an open conduit connecting said upper section of the chamber with the throat of said ejector, an inlet extending through an outer wall of said chamber and into the throat of said ejector above the constriction thereof for introducing said vapors and gases, an open elongated conduit aligned centrally of said chamber and extending vertically through the lower section into the upper section of said chamber for passing said catalyst and fluids from said lower to said upper section, an ejector in the lower end of said elongated conduit, an inlet in the bottom of said chamber communicating with said conduit below the ejector therein for introducing fluid into said upper section, and an outlet below said baffle in said lower section of the chamber.

10. The process of converting hydrocarbon oils which comprises introducing the vapors thereof into a constricted area of a tubular passageway connecting an elongated reaction zone with an elongated regeneration zone, drawing hydrocarbon conversion catalyst and regeneration effluent gases from said regeneration zone into said reaction zone through said passageway with said hydrocarbon vapors, thoroughly mixing said vapors with said regeneration gases and said catalyst, separating in the reaction zone said catalyst from a mixture of conversion products and said regeneration effluent gases, separating said mixture into fixed gases and hydrocarbon fractions, regenerating said catalyst by passing it in fluid suspension through a regeneration zone, introducing an oxidizing regeneration gas comprising oxygen and steam into said regeneration zone, oxidizing and removing carbonaceous deposits from said catalyst, and drawing said regenerated catalyst and regeneration effluent gases comprising hydrogen and products of a water gas reaction into said reaction zone with said hydrocarbon vapors.

11. The process according to claim 10 in which hydrocarbon oils are cracked in the presence of a cracking catalyst.

JESSE A. GUYER.

REFERENCES CITED

The following references are of record in the file of this patent:

UNITED STATES PATENTS

| Number | Name | Date |
| --- | --- | --- |
| 2,358,039 | Thomas et al. | Sept. 12, 1944 |
| 2,412,152 | Huff | Dec. 3, 1946 |

Certificate of Correction

Patent No. 2,450,753.                                                                                       October 5, 1948.

JESSE A. GUYER

It is hereby certified that error appears in the printed specification of the above numbered patent requiring correction as follows:

Column 6, line 72, claim 3, for the word "ozone" read *zone*;

and that the said Letters Patent should be read with this correction therein that the same may conform to the record of the case in the Patent Office.

Signed and sealed this 21st day of December, A. D. 1948.

[SEAL]

THOMAS F. MURPHY,
*Assistant Commissioner of Patents.*